(No Model.)

R. W. RAY.
REVOLVING HAY RAKE.

No. 267,017. Patented Nov. 7, 1882.

Witnesses:

Inventor:
R. W. Ray,
per C. A. Snow & Co.
Attorneys.

UNITED STATES PATENT OFFICE.

ROBERT W. RAY, OF MONTICELLO, MISSOURI.

REVOLVING HAY-RAKE.

SPECIFICATION forming part of Letters Patent No. 267,017, dated November 7, 1882.

Application filed September 7, 1882. (No model.)

*To all whom it may concern:*

Be it known that I, ROBERT W. RAY, of Monticello, in the county of Lewis and State of Missouri, have invented certain new and useful Improvements in Revolving Hay-Rakes; and I do hereby declare that the following is a full, clear, and exact description of the invention, which will enable others skilled in the art to make and use the same, reference being had to the accompanying drawings, which form a part of this specification.

This invention relates to revolving horse hay-rakes, and has for its object to provide a simple and efficient device embodying convenient means for controlling the rake stop mechanism.

Figure 1:
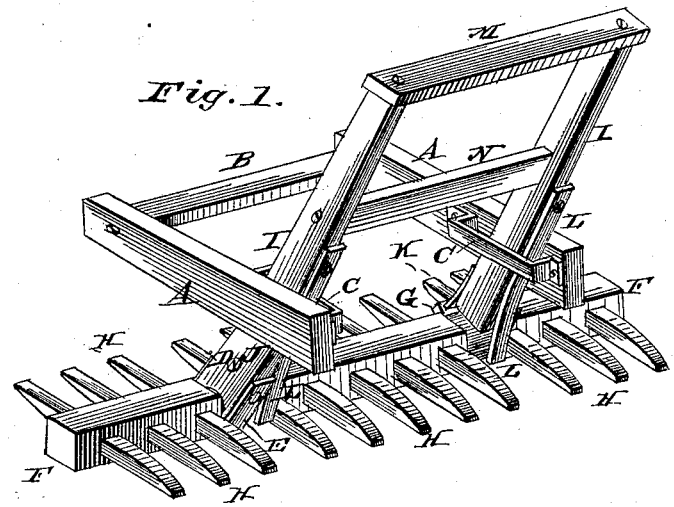
Figure 2:
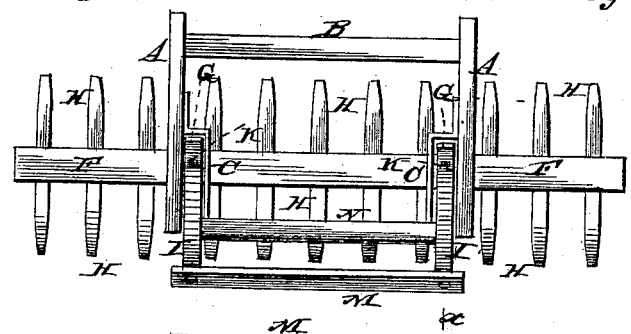
Figure 3:
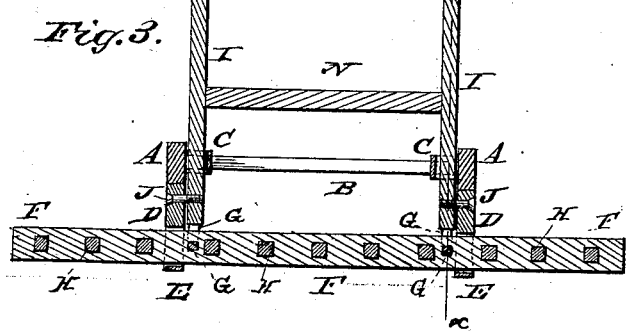
Figure 4:
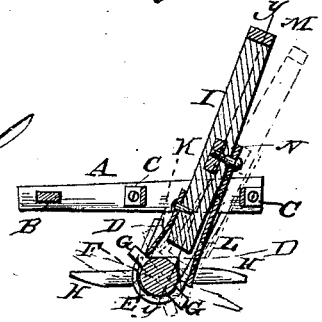

In the drawings, Figure 1 is a perspective view of my improved rake. Fig. 2 is a top view. Fig. 3 is a sectional view on line $y\ y$, Fig. 4. Fig. 4 is a sectional view on the line $x\ x$, Fig. 3.

Referring to the drawings, A A designate the side bars of the front frame, which are connected forward by a cross-piece, B, and are each provided on their inner rear sides with a strap or staple, C, parallel with said sides.

From the under edge of bars A A, at the rear end, extend forwardly-inclined extensions D D, at the lower end of which are provided bearings E for the rake-head F, the latter being provided adjacent to said bearings with opposite pins or studs, G G, and having the teeth H.

I I are the two side bars of the rear operating-frame. They pass through straps C C, and are pivoted below the latter to extensions D D by transverse pins J. Bars I I are provided at the upper front edges with short springs K, projecting in front and at their rear edges, with a long projecting flat spring, L, secured above the staple C and passing down through the same.

M N are cross-bars connecting bars I I.

The operation and advantages of my invention will be readily understood. Bars I I are braced and guided by the straps C, and their movement is also limited thereby. When the bars I I are moved forward with the rear frame the springs K will engage studs G to depress the forward teeth of the rake, which is turned slightly by this movement, into the ground. This movement will relieve the rear springs, L, from engagement with studs G G, and thus admit of the rake making a complete unobstructed revolution. When the bars I I are depressed rearwardly to cause the front teeth to ride over any obstructions the springs L will bind against and be braced by the rear ends of staples C, when they will engage the studs G and force the rake-head slightly over backwardly. Thus it will be seen that straps C C brace and protect from lateral displacement both bars I I and springs L L.

I claim as new—

The combination, with the front frame, having side bars A A, each having on its inner face, near the rear end, a parallel strap or staple, C, and provided with forwardly-inclined extensions D D, of the rake-head journaled at the bottom of the latter, and having pins G G, and the side bars I I of the rear operating-frame, which are pivoted to the extensions D and pass up through the staples C, and are provided each with a front short spring, K, and long rear spring, L, which extends up and is secured above the staple, as set forth.

In testimony that I claim the foregoing as my own I have hereto affixed my signature in presence of two witnesses.

ROBERT WILLIAM RAY.

Witnesses:
OLIVER C. CLAY,
FRANCIS L. MARCHAND.